Patented June 19, 1923. 1,458,944

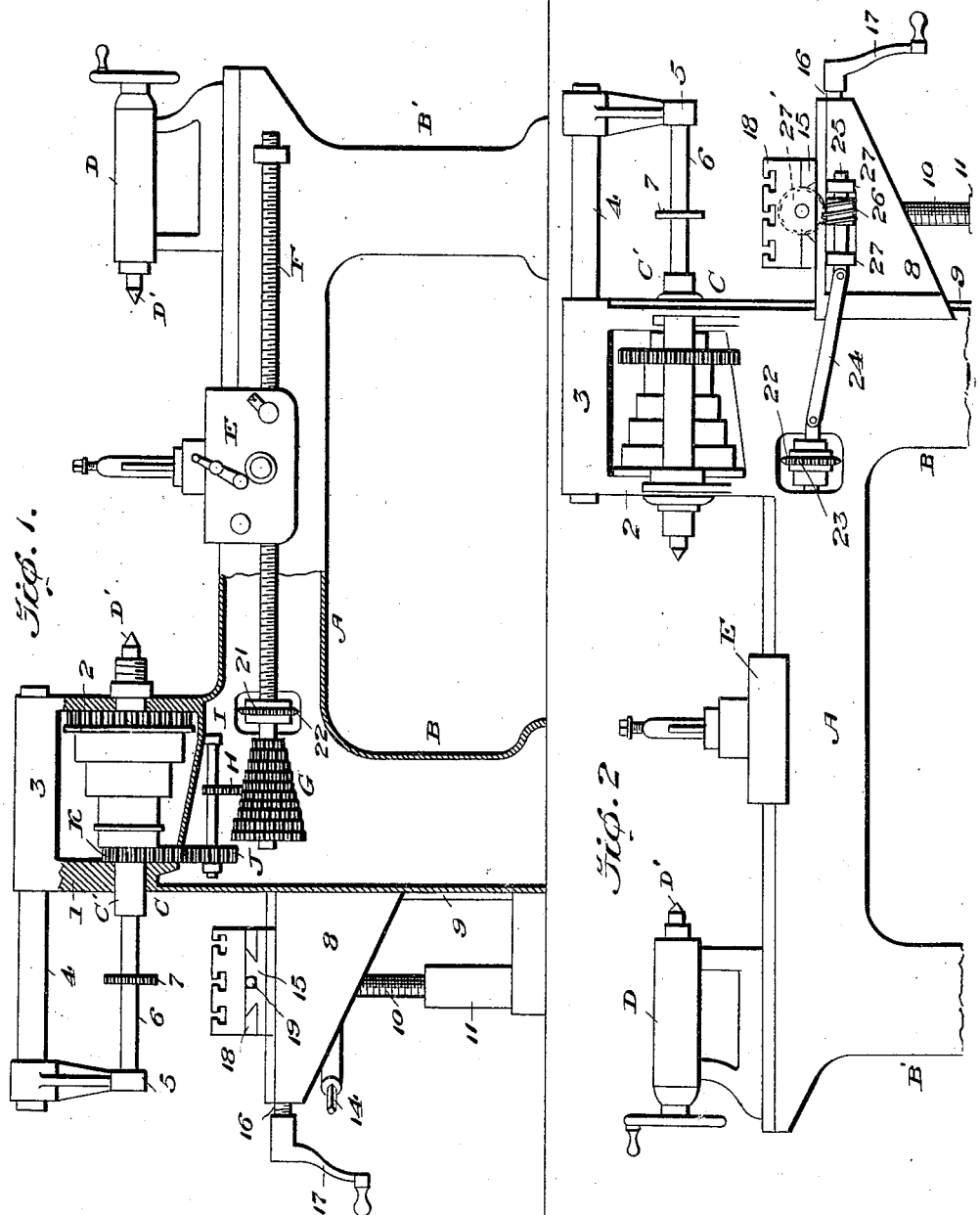

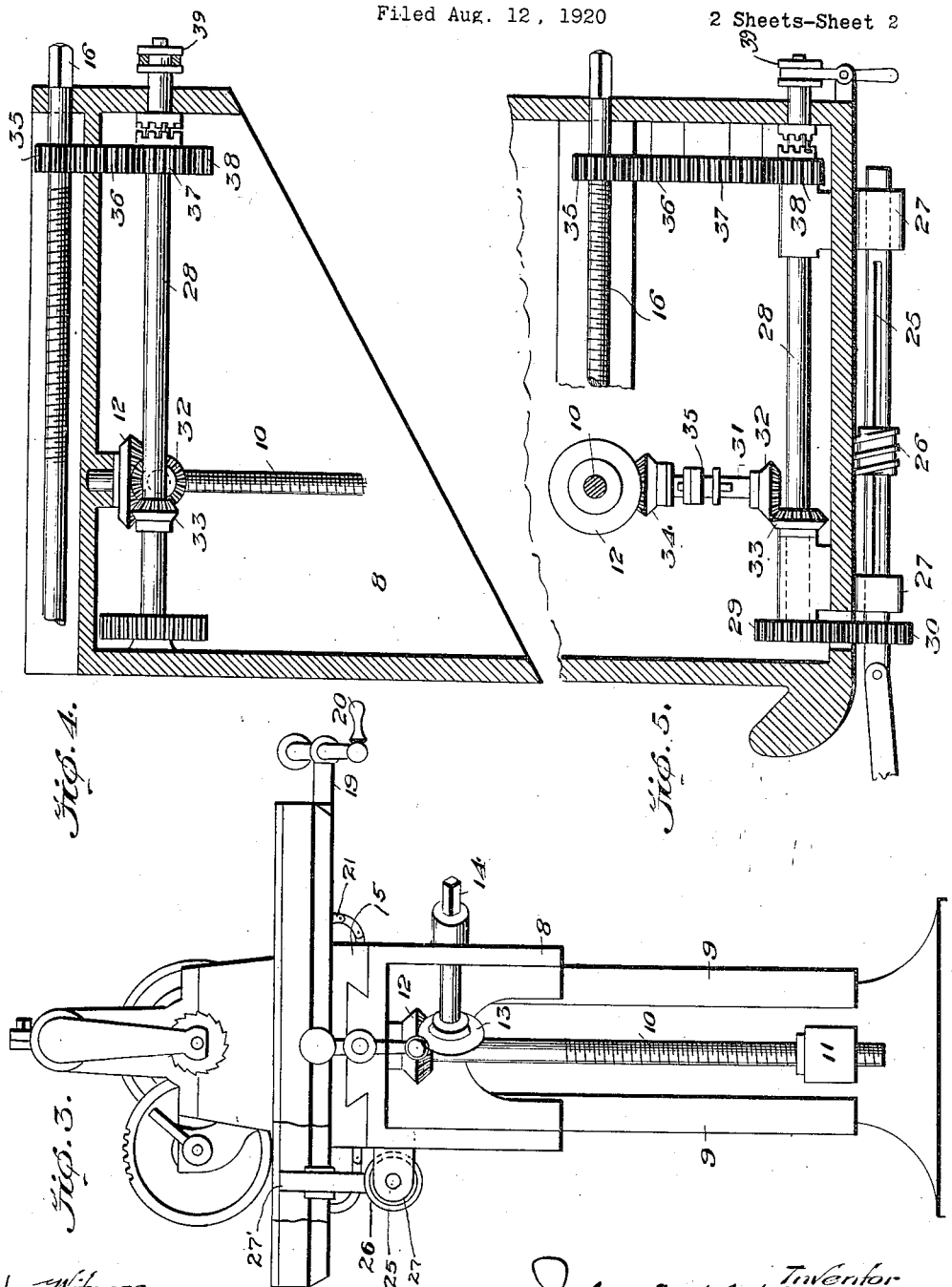

UNITED STATES PATENT OFFICE.

JOHN D. KOHLMANN, OF MILWAUKEE, WISCONSIN.

COMBINED MILLING AND TURNING MACHINE.

Application filed August 12, 1920. Serial No. 403,014.

*To all whom it may concern:*

Be it known that I, JOHN D. KOHLMANN, a citizen of the United States, residing at Milwaukee, in the county of Milwaukee and State of Wisconsin, have invented certain new and useful Improvements in Combined Milling and Turning Machines, of which the following is a specification.

My invention relates to a combined milling and turning machine, and the object is to provide an arrangement to permit of doing both milling and turning work.

In the accompanying drawings:

Fig. 1 is a front elevation of my improved machine:

Fig. 2 is a rear elevation thereof; and

Fig. 3 is an end view.

Fig. 4 is an enlarged longitudinal sectional view through the knee;

Fig. 5 is a horizontal sectional view through the knee taken just below the top plate.

The lathe consists of the usual bed A, legs B and B′, head stock C, spindle C′, tail stock D, dead center D′, carriage E, feed screw F, differential speed gear G, arranged at the inner ends of the feed screw F, which are in turn connected or driven by an adjustable gear H, slidably keyed upon a shaft I, which in turn is driven by a gear J, meshing with a gear K, keyed to the spindle C′ of the lathe.

The supports 1 and 2 for the spindle C′, are extended upwardly supporting a bearing 3, in which is slidably journaled a shaft 4, to the outer end of which is secured an outboard bearing 5. Extending from the spindle C′ is a removable milling arbor 6, the outer end thereof being supported in or by the lower end of the out board bearing 5, mounted on said shaft 4, while the inner end of said arbor is removably connected to the spindle C′ and is driven thereby. Mounted on said arbor is a cutter 7.

Arranged directly beneath the cutter 7 is a knee 8, preferably mounted at the head end of the lathe on the front leg B, upon suitable guides 9—9 and is capable of vertical adjustment by means of a vertically arranged screw 10, the lower end thereof being secured in a screw threaded support 11, while the upper end is rotatably secured in the knee 8. A beveled gear 12 is keyed for vertical movement upon the upper end of the screw 10, which in turn meshes with a similar beveled gear 13, secured to the inner end of a horizontally arranged shaft 14, carried by the knee 8, thus affording a means for manually adjusting the knee 8 in a vertical direction.

Arranged for longitudinal movement upon the knee 8, parallel of the axis of the spindle C′, is a saddle 15, being normally actuated by a worm 16, provided with a removable actuating handle 17, said handle also serving as a means of actuating the horizontal shaft 14 to effect the vertical movement of the knee 8. Mounted for horizontal movement upon the saddle 15, and transversely thereof is a milling table 18, which is likewise manually actuated by a worm shaft 19, supported in suitable bearings upon the saddle 15, said worm being manually actuated by a suitable handle 20.

As a means for automatically actuating the knee 8, the saddle 15, and the milling table 18, I preferably arrange a sprocket 21 on the carriage feed screw F, which is connected through an opening in lathe bed A by a sprocket chain 22, or through suitable gearings with a similar sprocket 23, arranged on the rear side of the lathe. This last-named sprocket is connected to a telescopic drive shaft 24, which in turn is flexibly connected with shaft 25 upon which is journaled a worm 26, said shaft 25 being journaled in suitable bearings 27—27 on the side of the knee 8. This worm 26 meshes with a worm gear 27′ keyed upon the worm shaft 19, whereby the milling table 18 is automatically actuated. 28 indicates a secondary shaft mounted in suitable bearings within the knee 8, and lies parallel with the shaft 25, and is geared thereto by suitable gears 29 and 30. An intermediate shaft 31 is interposed between the shaft 28 and the vertically arranged screw 10, said shaft 31 being provided at one end with a beveled gear 32 which meshes with a bevel gear 33 keyed to the secondary shaft 28, while at the opposite end a bevel gear 34 meshes with the bevel gear 12, whereby the screw 10 is mechanically actuated. The usual clutch 35 on the shaft 31 serves as a means to disengage the mechanical driving means when it is desirable to manually actuate the knee 8.

As a means for mechanically actuating the worm shaft 16, which actuates the saddle 15, a train of gears 35, 36, 37 and 38 are arranged between the secondary shaft 28 and the screw-shaft 16. The usual clutch member 39 is arranged between the shaft 28 and the gear 38 for disengaging the mechanical driving mechanism.

It will thus be seen that I have so arranged a milling machine in connection with the usual lathe construction whereby the mechanism for delivering power thereto may be utilized as a driving means for the cutter, and the feed screw driving mechanism may also transmit power to certain work feeding mechanism arranged upon the milling machine knee, whereby the automatic operation of the milling machine may be effected. It will be observed that this arrangement in no way hinders the use of both the milling machine and lathe simultaneously.

I claim:

In combination with a lathe, a knee mounted for vertical movement upon one leg of the lathe, a saddle for longitudinal movement upon said knee, a milling table mounted upon said table and adapted to move transversely thereof, a mill tool mounted to turn with the spindle of the lathe, a vertical feed screw arranged beneath said knee, a drive shaft journaled upon said knee, a flexible shaft connected thereto and driven from the feed mechanism of the lathe, a secondary shaft carried by said knee and driven by said shaft, a jack shaft carried by said knee adapted to transmit motion from said secondary shaft to said vertically arranged feed screw, a feed screw arranged longitudinally of the knee in connection with the saddle, said feed screw being geared to the secondary shaft whereby the saddle may be actuated automatically, a feed screw connected with said milling table, a worm suitably keyed to said motion drive shaft, a worm suitably keyed to said milling table feed screw and in communication with said worm whereby the milling table is moved transversely of the knee.

In testimony whereof I affix my signature.

JOHN D. KOHLMANN.